United States Patent
Bergner et al.

(10) Patent No.: US 10,839,488 B2
(45) Date of Patent: Nov. 17, 2020

(54) DEVICE AND METHOD FOR DENOISING A VECTOR-VALUED IMAGE

(71) Applicant: KONINKLIJKE PHILIPS N.V., Eindhoven (NL)

(72) Inventors: Frank Bergner, Hamburg (DE); Bernhard Johannes Brendel, Norderstedt (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 73 days.

(21) Appl. No.: 16/092,066

(22) PCT Filed: Apr. 24, 2017

(86) PCT No.: PCT/EP2017/059582
§ 371 (c)(1),
(2) Date: Oct. 8, 2018

(87) PCT Pub. No.: WO2017/190968
PCT Pub. Date: Nov. 9, 2017

(65) Prior Publication Data
US 2019/0122342 A1   Apr. 25, 2019

(30) Foreign Application Priority Data
May 3, 2016  (EP) .................................. 16168100

(51) Int. Cl.
*G06T 5/00* (2006.01)
*G06T 11/00* (2006.01)
*G06F 17/16* (2006.01)

(52) U.S. Cl.
CPC .............. *G06T 5/002* (2013.01); *G06F 17/16* (2013.01); *G06T 11/008* (2013.01);
(Continued)

(58) Field of Classification Search
CPC ................... G06T 5/002; G06T 11/008; G06T 2207/10072; G06T 2207/10081; G06T 2211/408; G06T 2211/424; G06F 17/16
See application file for complete search history.

(56) References Cited

U.S. PATENT DOCUMENTS

2003/0156684 A1   8/2003  Fessler
2008/0240525 A1*  10/2008 Kalke .................. G06T 11/006
                                                        382/128
(Continued)

FOREIGN PATENT DOCUMENTS

EP    2385494      11/2011
WO    2003071483   8/2003

OTHER PUBLICATIONS

"Suppression of Correlated Noise", Jan Aelterman, Bart Goossens, Aleksandra Pizurica and Wilfried Philips; Ghent University, TELIN-IPI-IBBT; Belgium (Year: 2010).*
(Continued)

*Primary Examiner* — Khai M Nguyen
(74) *Attorney, Agent, or Firm* — Larry Liberchuk

(57) ABSTRACT

The present invention relates to a device (100) for denoising a vector-valued image, the device (100) comprising: a generator (10), which is configured to generate an initial loss function (L_I) comprising at least one initial covariance matrix (ICM) defining a model of correlated noise for each pixel of the vector-valued image; a processor (20), which is configured to provide a final loss function (L_F) comprising a set of at least one final covariance matrix (FCM) based on the initial loss function by modifying at least one submatrix and/or at least one matrix element of the initial covariance matrix (ICM); and a noise-suppressor (30), which is configured to denoise the vector-valued image using the final
(Continued)

loss function (L_F) comprising the set of the at least one final covariance matrix (FCM).

13 Claims, 5 Drawing Sheets

(52) U.S. Cl.
CPC ........... *G06T 2207/10072* (2013.01); *G06T 2207/10081* (2013.01); *G06T 2211/408* (2013.01); *G06T 2211/424* (2013.01)

(56) References Cited

U.S. PATENT DOCUMENTS

| | | |
|---|---|---|
| 2010/0220912 A1 | 9/2010 | Bruder |
| 2011/0158498 A1 | 6/2011 | Li |
| 2011/0200248 A1* | 8/2011 | Matabosch ........ G06K 9/00214 382/154 |
| 2012/0063662 A1 | 3/2012 | Kwon |
| 2012/0134561 A1* | 5/2012 | Xu ........................ G06T 5/002 382/131 |
| 2013/0287279 A1* | 10/2013 | Roessl ................ G06T 11/006 382/131 |
| 2013/0346624 A1 | 12/2013 | Chervets |
| 2018/0268207 A1* | 9/2018 | Kim ....................... G06T 13/40 |

OTHER PUBLICATIONS

"Treating Correlated Noise in SHARP"; Nicholas Chapman (Year: 2012).*

Petrongolo, et al., "A general framework of noise suppression in material decomposition for dual-energy CT", Medical Physics, Aug. 1, 2015.

Niu, et al., "Iterative image-domain decomposition for dual-energy CT", Medical Physics, vol. 41, No. 4, Apr. 1, 2014.

* cited by examiner

DEVICE AND METHOD FOR DENOISING A VECTOR-VALUED IMAGE

CROSS REFERENCE TO RELATED APPLICATIONS

This application is the U.S. National Phase application under 35 U.S.C. § 371 of International Application No. PCT/EP2017/059582 filed Apr. 24, 2017, published as WO 2017/190968 on Nov. 9, 2017, which claims the benefit of European Patent Application Number 16168100.2 filed May 3, 2016. These applications are hereby incorporated by reference herein.

FIELD OF THE INVENTION

The present invention relates to the field of iterative image reconstruction. Particularly, the present invention relates to a device and a method for denoising a vector-valued image.

BACKGROUND OF THE INVENTION

In iterative denoising in an image domain, for spectral, or multi-energy X-ray computed tomography, a cost or loss function is iteratively solved which has typically the form $$L(\mu) = \Sigma_i (\mu_i - \mu_{i,orig})^T C_i^{-1} (\mu_i - \mu_{i,orig}) + \beta R(\mu)$$

where i is the index of the i-th image pixel. $C_i^{-1}$ is the inverse of the covariance matrix describing the noise between the material values of the material images (e.g., photo effect and Compton scatter) for the same image pixel i. $\mu_{i,orig}$ is a vector containing the different material values for pixel i of the input images, while $\mu_i$ contains the material values of the denoised images for pixel i.

For the single-material case $C_i^{-1}$ is the inverse noise variance in each pixel. $R(\mu)$ is a regularization term and $\beta$ a regularization strength parameter. The terms with $C_i^{-1}$ reflect a model of correlated Gaussian noise in each pixel.

In multi-energy CT the noise for one image pixel is strongly correlated between the materials, and thus the coupling introduced by $C_i^{-1}$ will remove efficiently correlated noise portions, but experience shows that it also leads to crosstalk between the denoised material images, e.g. iodine portions can appear in images which should be free from iodine for instance.

US 2010/0220912 A1 describes devices and methods for the noise reduction of CT image data with a scanning of an examination object and generation of at least two CT image data records each taking place on the basis of a different X-ray energy spectrum.

US 2013/0343624 A1 describes methods for reconstructing image component densities of an object including acquiring multi-spectral x-ray tomographic data, performing a material decomposition of the multi-spectral x-ray tomographic data to generate a plurality of material sinograms, and reconstructing a plurality of material component density images by iteratively optimizing a functional that includes a joint likelihood term of at least two of the material decomposed sinograms.

SUMMARY OF THE INVENTION

There may be a need to improve device and methods for denoising vector-valued images.

These needs are met by the subject-matter of the independent claims. Further exemplary embodiments are evident from the dependent claims and the following description.

An aspect of the present invention relates to device for denoising a vector-valued image. The device comprises a generator, a processor, and a noise-suppressor.

The generator is configured to generate an initial loss function comprising at least one initial covariance matrix a model of correlated noise for each pixel of the vector-valued image.

The processor is configured to provide a final loss function comprising a set of at least one final covariance matrix based on the initial loss function by modifying at least one submatrix and/or at least one matrix element of the initial covariance matrix.

The noise-suppressor is configured to denoise the vector-valued image using the final loss function comprising the set of the at least one final covariance matrix.

In other words, the present invention advantageously provides that false diagnostic results are avoided since denoising processing is improved.

The present invention advantageously reduces the crosstalk by, for example, introducing frequency specific correlations between material values of one pixel or of subareas, i.e. image contents with low spatial frequency and high spatial frequency image contents can have different degree of correlation in the noise model.

A further, second aspect of the present invention relates to a medical imaging system comprising a device according to the first aspect or according to any implementation form of the first aspect.

A further, third aspect of the present invention relates to a method for denoising a vector-valued image, the method comprising the following steps of:

Generating an initial loss function comprising at least one initial covariance matrix defining a model of correlated noise for each pixel of the vector-valued image by means of a generator;

Providing a final loss function comprising a set of at least one final covariance matrix based on the initial loss function by modifying at least one submatrix and/or at least one matrix element of the initial covariance matrix by means of a processor; and Denoising the vector-valued image using the final loss function comprising the set of at least one final covariance matrix by means of a noise-suppressor.

According to an exemplary embodiment of the present invention, the processor is configured to modify the at least one submatrix and/or the at least one matrix element of the initial covariance matrix by splitting the initial covariance matrix into two or more matrices, thereby providing the set in terms of at least two final covariance matrices based on at least two different spatial frequency bands of the vector-valued image. For example, the correlation in a low-frequency band of at least two different spatial frequency bands is lowered and therefore the crosstalk is advantageously reduced.

According to an exemplary embodiment of the present invention, the processor is configured to modify the at least one submatrix and/or the at least one matrix element of the initial covariance matrix, wherein the least two final covariance matrices are based on at least two different spatial frequency bands of the vector-valued image, defined by at least one high spatial frequency band and by at least one low spatial frequency band, wherein the high spatial frequency band comprises higher frequencies than the low spatial frequency band. This advantageously allows that a trade-off is provided between cross-talk and correlated denoising performance that can be tuned by adjusting.

In other words, for example, for the frequency dependent method, the input covariance is split in two or more parts, so that a multitude of covariance matrices is provided. During the noise-suppressor operation the images maybe for instance split into one image for high frequencies and image for low frequencies, and both are subject to denoising using the above set of individual covariance matrices, i.e. one matrix of the least two final covariance matrices is used for high frequencies and one matrix of the least two final covariance matrices is used for low frequencies.

In other words, according to an exemplary embodiment of the present invention, there might be multiple covariance matrices used for different image portions and the splitting of images in the different frequency bands may be performed during the denoising with the noise suppressor.

According to an exemplary embodiment of the present invention, the processor is configured to provide the set of at the least final two covariance matrices based on a tuning between cross-talk removal and correlated noise removal of frequency noise. This advantageously allows an improved denoising performance.

According to an exemplary embodiment of the present invention, the generator is configured to generate the initial loss function by adding a regularization term to a matrix product of the at least one initial covariance matrix and the vector-valued image. This provides advantageously an improved correlated noise removal of frequency noise by adjusting the regularization term.

According to an exemplary embodiment of the present invention, the generator is configured to generate the initial loss function by adding the regularization term comprising a regularization strength parameter. This advantageously allows an improved denoising performance.

According to an exemplary embodiment of the present invention, the generator is configured to generate the initial loss function comprising the at least one initial covariance matrix, which is constant for all pixel positions across the vector-valued image. This advantageously allows an improved denoising performance with reduced required computing power.

According to an exemplary embodiment of the present invention, the processor is configured to provide the final loss function comprising the final covariance matrix based on a splitting of the initial covariance matrix. This advantageously allows an improved denoising performance with reduced denoising artefacts.

According to an exemplary embodiment of the present invention, the processor is configured to provide the final loss function comprising the set of the at least one final covariance matrix based on the initial loss function by performing:
i) a frequency dependent covariance tuning in a material projection domain of a maximum-likelihood CT reconstruction of the vector-valued image; and/or
ii) projection denoising with a Gaussian noise model of the vector-valued image.

According to an exemplary embodiment of the present invention, the processor is configured to provide the final loss function comprising the set of the at least one final covariance matrix based on the initial loss function by reducing absolute values of off-diagonal elements of the initial covariance matrix at edges of material inhomogeneities of at least n materials of the vector-valued image. This advantageously provides a method to reduce the absolute values of off-diagonal elements in the covariance-matrices at edges of inhomogeneities in the material images. This advantageously allows an improved denoising performance.

According to an exemplary embodiment of the present invention, the processor is configured to extract the edges of the material inhomogeneities from the vector-valued image with a reduced noise level. This advantageously provides an improved image denoising with reduced and suppressed crosstalk.

According to an exemplary embodiment of the present invention, the processor is configured to extract the edges of the material inhomogeneities by applying a Sobel operator, a Prewitt operator, a Marr-Hildreth operator, a Laplacian operator or a differential edge detection to the vector-valued image. This advantageously allows an improved denoising performance.

According to an exemplary embodiment of the present invention, the processor is configured to extract the edges of the material inhomogeneities by applying a classification algorithm, like a support vector machine or neuronal network, on features extracted from the images. This advantageously allows an improved denoising performance.

According to an exemplary embodiment of the present invention, based on a prior training or a pre-training with a training dataset, the processor is configured to apply the classification algorithm which gives a high value higher than an average value or higher than an initially present value in each pixel, if material inhomogeneities, like edges are most likely to be present. In other words, if edges are detected with a certain probability, for instance if there is a detection of an edge with the probability of 95% that the detection is true. For pixel with high values, the covariance and thus the crosstalk are advantageously reduced by the processor applying the classification algorithm.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) or an EPROM (Erasable Programmable Read Only Memory). A computer-readable medium may also be a data communication network, for example the Internet, which allows downloading a program code.

The methods, systems, and devices described herein may be implemented as software in a Digital Signal Processor, DSP, in a micro-controller or in any other side-processor or as a hardware circuit within an application specific integrated circuit, ASIC, CPLD or FPGA.

The present invention can be implemented in digital electronic circuitry or in computer hardware, firmware, software, or in combinations thereof, for instance in available hardware of conventional medical imaging devices or in new hardware dedicated for processing the methods described herein.

BRIEF DESCRIPTION OF THE DRAWINGS

A more complete appreciation of the invention and the attendant advantages thereof will be clearly understood by reference to the following schematic drawings, which are not to scale, wherein.

DETAILED DESCRIPTION OF EMBODIMENTS

Figure 1:
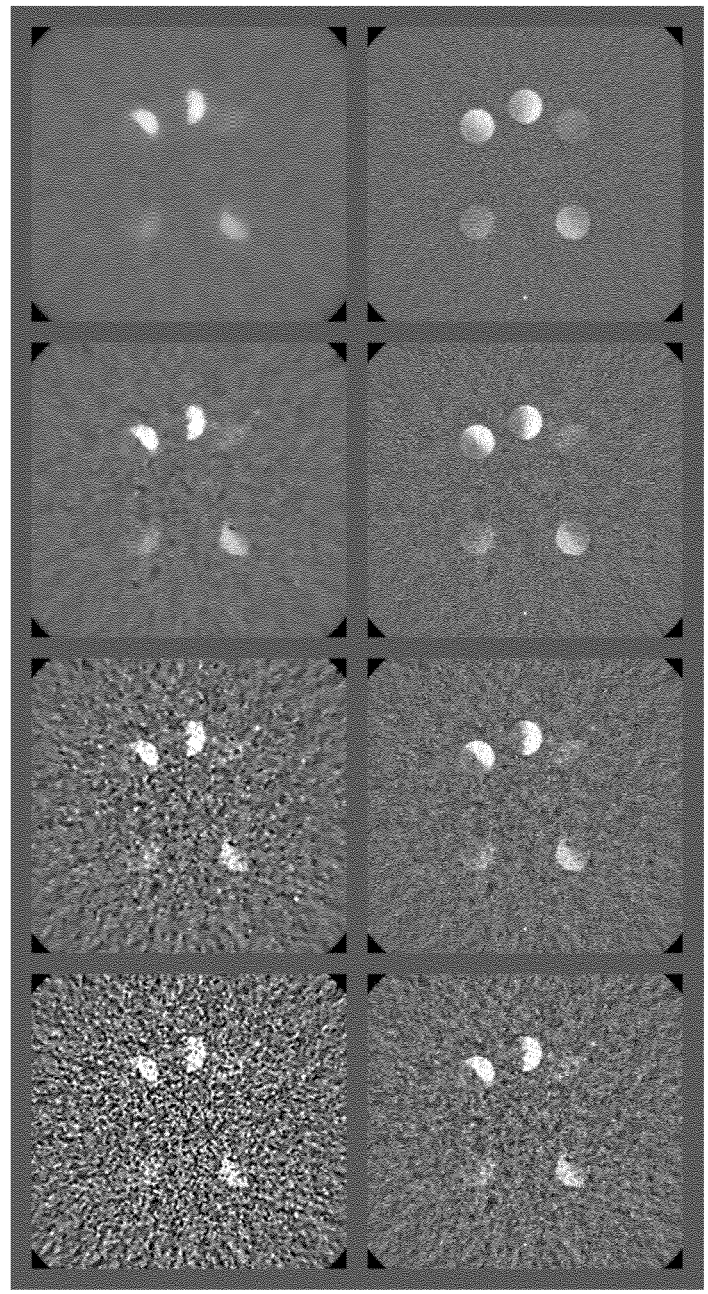
FIG. 1 shows denoising results of a scatter image from a multi-channel photo/scatter reconstruction for explaining the present invention.

The illustration in the drawings is purely schematic and does not intend to provide scaling relations or size information. In different drawings, similar or identical elements are provided with the same reference numerals. Generally, identical parts, units, entities or steps are provided with the same reference symbols in the description.

FIG. 1 shows denoising results of a scatter image from a multi-channel photo/scatter reconstruction for explaining the present invention.

As shown in FIG. 1, images are split into different spatial frequency bands, e.g. high and low spatial frequencies. Depending on the frequency bands the correlation between the different materials is then modified in the cost function.

In FIG. 1, the upper row shows the novel approach with a covariance set to zero in the low frequencies. The lower row shows a conventional denoising. The columns show different levels of regularization strength. The lower right image shows a large amount of cross-talk in the inserts, if compared with the ground truth as shown later in FIG. 2. The method for denoising a vector-valued image provides an improved approach which reduces this cross-talk, as shown in the upper right image of FIG. 1.

For example, the method for denoising vector-valued images allows to lower the correlation between the materials in the low-frequency bands and therefore reduce the cross-talk between the materials in these bands. This comes at the expense of a reduced performance of removing correlated noise in these bands as the noise model now assumes less correlation due to the reduced correlation.

Figure 2:
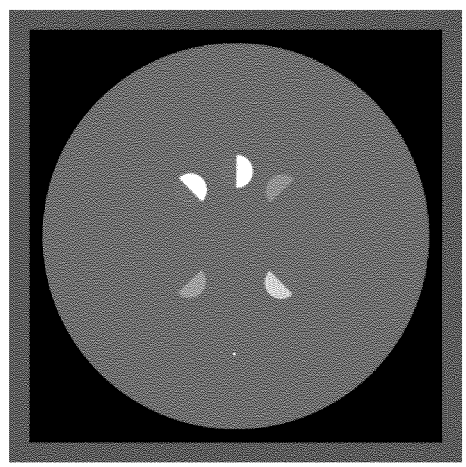
FIG. 2 shows denoising results of a scatter image from a multi-channel photo/scatter reconstruction in terms of a ground truth scatter image for explaining the present invention.

According to an exemplary embodiment of the present invention, a tuning between cross-talk and correlated noise removal of low-frequency noise is provided by the processor and/or by the noise suppressor. Applying the method for denoising a vector-valued image provides an improved approach as shown in FIG. 1 and FIG. 2. In particular, FIG. 1 and FIG. 2 both show an example how the present method reduces the cross-talk.

FIG. 2 shows denoising results of a scatter image from a multi-channel photo/scatter reconstruction in terms of a ground truth scatter image for explaining the present invention.

According to an exemplary embodiment of the present invention, we have an abstracted cost function $L(\mu)$ of the above one like, $$L(\mu)=(\mu-\mu_{orig})^T W(\mu-\mu_{orig})+\beta R(\mu)$$

where the image vectors $\mu$ consist of all materials and pixel positions. The matrix W can be viewed as a block-diagonal matrix with the inverted covariances of the original problem on the diagonal. $\mu_{orig}$ is a vector containing the different material values for each pixel of the input images, while $\mu$ contains the material values of the denoised images for each pixel.

For the single-material case W is the inverse noise variance in each pixel. $R(\mu)$ is a regularization term and $\beta$ a regularization strength parameter.

We now introduce a frequency split into high and low spatial frequencies, HF and LF, $$L(\mu)=((F_{HF}+F_{LF})d)^T W((F_{HF}+F_{LF})d)+\beta R(\mu),$$

where we abbreviate the difference $\mu-\mu_{orig}$ as d. The matrices $F_{HF}$ and $F_{LF}$ perform the filtering. In a frequency split we can choose for example $F_{HF}+F_{LF}=I$, i.e. the identity matrix, so that we still have the original problem if we add the filters.

In a next step we can split W e.g. via a Cholesky decomposition into $$W=K^T K$$

$$L(\mu)=((F_{HF}+F_{LF})d)^T K^T K((F_{HF}+F_{LF})d)+\beta R(\mu)=$$
$$(F_{HF}d)^T K^T K(F_{HF}d)+(F_{LF}d)^T K^T K(F_{LF}d)+$$
$$(F_{LF}d)^T K^T K(F_{HF}d)+(F_{HF}d)^T K^T K(F_{LF}d)+\beta R(\mu)$$

This gives the opportunity now to choose $K^T$ differently for the high and low frequencies in each pixel position by selecting $K_{HF}$ and $K_{LF}$ $$L_{new}(\mu)=(F_{HF}d)^T K_{HF}^T K_{HF}(F_{HF}d)+(F_{LF}d)^T K_{LF}^T K_{LF}$$
$$(F_{LF}d)+(F_{LF}d)^T K_{LF}^T K_{HF}(F_{HF}d)+$$
$$(F_{HF}d)^T K_{HF}^T K_{LF}(F_{LF}d)+\beta R(\mu)$$

According to an exemplary embodiment of the present invention, the covariance matrix is constant for all pixel position across the image. The cost function can be reformulated to $$L_2(\mu) = \sum_i \sum_j c_{i,j}(\tilde{\mu}_i - \tilde{\mu}_{i,orig})^T(\tilde{\mu}_j - \tilde{\mu}_{j,orig}) + \beta R(\mu) = \sum_i \sum_j c_{i,j}\tilde{d}_i^T \tilde{d}_j + \beta R(\mu)$$

where $\tilde{\mu}_i$ is the image vector with the pixel values for the i-th material. $c_{i,j}$ are the coefficients of the inverse covariance matrix. $\tilde{d}_i$ now denotes the difference vectors accordingly.

The filtering is now introduced differently via $$L_{new,2}(\mu) = \sum_i \sum_j c_{i,j,LF}\tilde{d}_i^T F_{LF}^T F_{LF}\tilde{d}_J + \sum_i \sum_j c_{i,j,HF}\tilde{d}_i^T F_{HF}^T F_{HF}\tilde{d}_J + \beta R(\mu)$$

where $c_{i,j,LF}$ and $c_{i,j,HF}$ are the inverse covariances for the low and high frequencies. Again $F_{LF}$ and $F_{HF}$ are the spatial filters, which here operate on the different material images. The cost function obviously can be reduced to the original problem by choosing $$c_{i,j,LF}=c_{i,j,HF}=c_{i,j}$$

and $$F^T_{HF}F_{HF}+F^T_{LF}F_{LF}=I$$

The latter condition is equivalent to a split of noise energy in the frequency domain.

According to an exemplary embodiment of the present invention the original problem is modified by adding additional terms $$\sum_i \sum_j c_{i,j,k}\tilde{d}_i^T F_k^T F_k \tilde{d}_J$$

to the cost or the loss function. Again the trade-off between cross-talk and correlated denoising performance can be tuned by adjusting.

According to an exemplary embodiment of the present invention, we introduce the frequency dependent covariance tuning in the material projection domain of a maximum-likelihood CT reconstruction or projection denoising with Gaussian noise model.

We can use the same formalism as in the above embodiments, except that we use for the reconstruction the forward project images Aµ and the measured projections instead of µ and $\mu_{orig}$.

Figure 3:
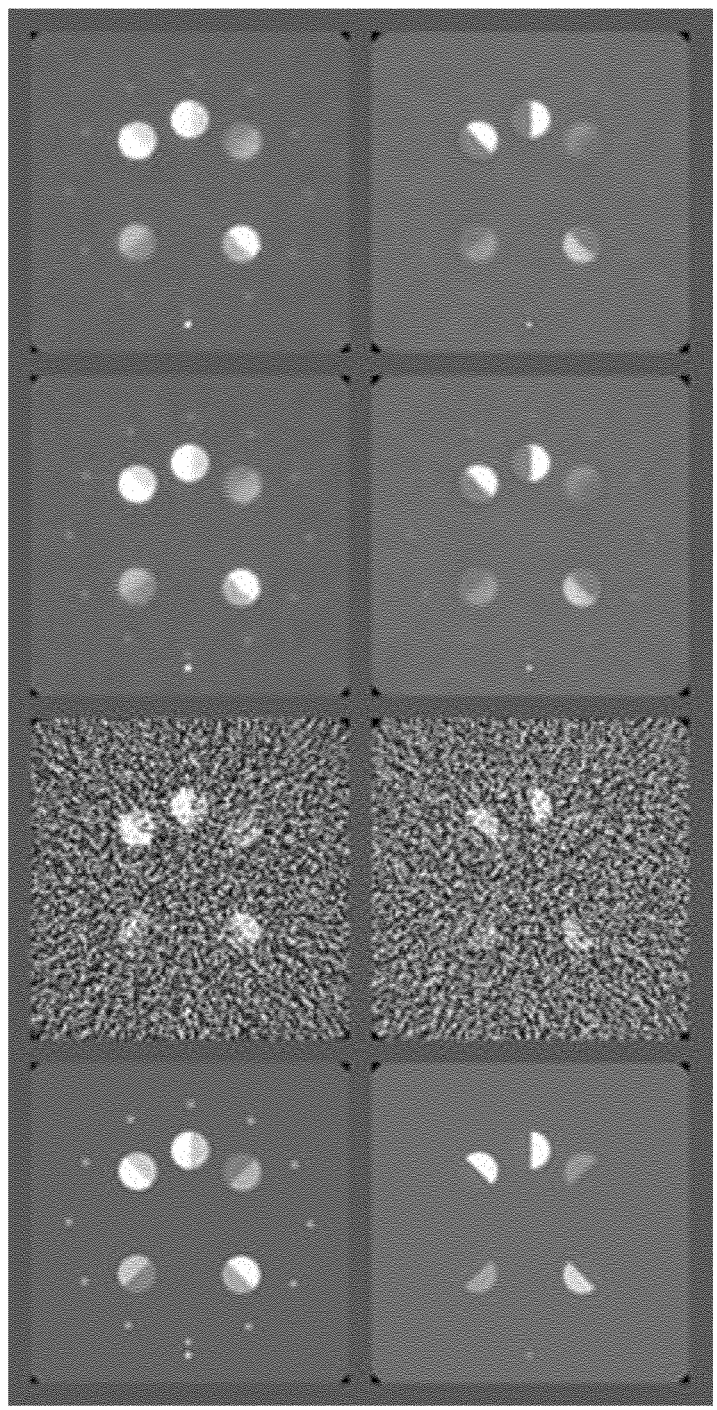
FIG. 3 shows a schematic photo effect images and Compton scatter images for explaining the present invention.

FIG. 3 shows a schematic photo effect images and Compton scatter images for explaining the present invention.

FIG. 3 shows applications of the proposed method to simulated data. The upper row shows photo effect images, the lower row Compton scatter images.

In FIG. 3, from left to right, the following images are shown: i) Ground truth (phantom), ii) Noisy input for denoising, iii) Denoising with original covariance matrices, iv) Denoising with modified covariance matrices according to the method for denoising of the present invention.

In FIG. 3, small inhomogeneities surrounding the larger inhomogeneities are display. These small inhomogeneities appear in the phantom only in the photo image as shown top left, not in the scatter image as shown bottom left.

Nevertheless, after applying the denoising with original covariance matrices, these inhomogeneities also appear in the scatter image (bottom, second from the right). This is one manifestation of the above mentioned crosstalk. Applying the denoising with the modified covariances, this crosstalk is significantly reduced (bottom right).

According to an exemplary embodiment of the present invention, in multi-energy CT the noise for one image pixel is strongly correlated between the materials, and thus the coupling introduced by $C_i^{-1}$ will remove efficiently correlated noise portions, but experience shows that it also leads to crosstalk between the material images, e.g. iodine portions can appear in images which should be free from iodine etc. This can result in false diagnostic results and needs to be avoided.

According to an exemplary embodiment of the present invention, root cause for the crosstalk between the material images is the representation of the strong noise correlation in the noise model. This becomes manifest in large negative values of the off-diagonal elements in the covariance-matrices $C_i$. Furthermore, it can be observed that the crosstalk appears especially strongly at edges of inhomogeneities. Thus the idea is to reduce the absolute values of off-diagonal elements in the covariance-matrices $C_i$ at edges of inhomogeneities in the material images.

According to an exemplary embodiment of the present invention, the edges of inhomogeneities are extracted from an image with low noise level (e.g., by applying a Sobel operator to, for instance, a pre-denoised 70 keV monoenergy image), and to reduce the absolute values of the off-diagonal elements of those covariance-matrices that belong to image pixels with a strong edge response. Then, the statistical denoising is performed utilizing the modified covariance matrices. Results for this process are given in FIG. 3.

Figure 4:
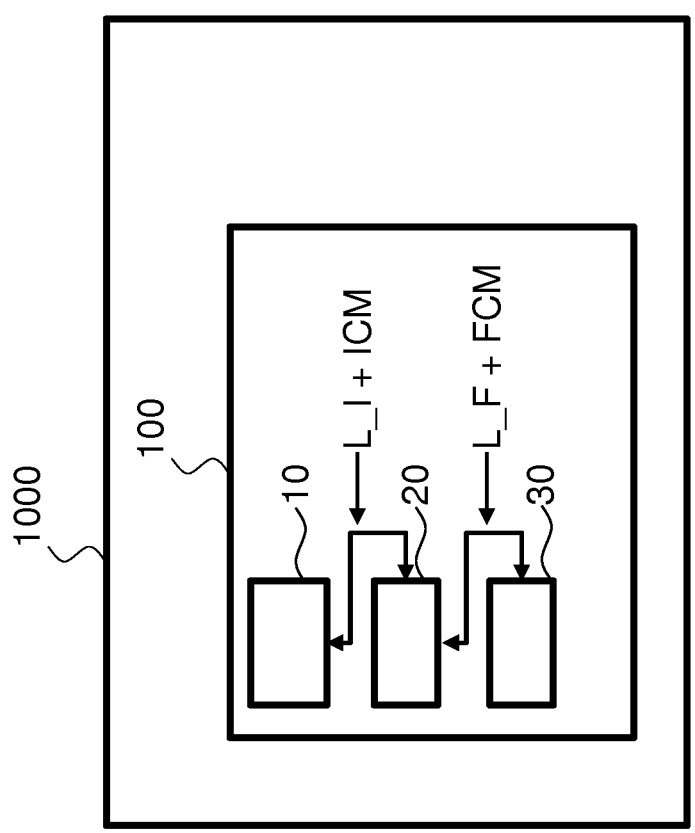
FIG. 4 shows a schematic diagram of a device for denoising a vector-valued image and a medical imaging system according to an exemplary embodiment of the present invention.

FIG. 4 shows a schematic diagram of a device for denoising a vector-valued image according to an exemplary embodiment of the present invention.

A medical imaging system 1000 may comprise a device 100 for denoising a vector-valued image. The medical imaging system 1000 may be for instance a computed tomography system, a C-arm based computed tomography, CT, system, an X-ray imaging system, a multispectral or spectral X-ray imaging system or a magnetic resonance imaging, MRI, system.

According to an exemplary embodiment of the present invention, the medical imaging system 1000 may be configured to provide vector-valued images in terms of multiple material images or in terms of multiple images of a scan. Medical imaging modalities such as MRI and CT scans produce large volumes of scalar or tensor measurements represented by vector-valued image.

According to an exemplary embodiment of the present invention, in statistical iterative denoising of material images (for spectral, or multi-energy CT) a cost function is iteratively solved which has typically the form $$L(\mu) = \Sigma_i (\mu_i - \mu_{i,orig})^T C_i^{-1} (\mu_i - \mu_{i,orig}) + \beta R(\mu),$$

where i is the index of the i-th image pixel. $C_i^{-1}$ is the inverse of the covariance matrix describing the noise between the values of the material images (e.g., photo effect and Compton scatter) for the same image pixel i. $\mu_{i,orig}$ is a vector containing the different material values for pixel i of the input images, while $\mu_i$ contains the material values of the denoised images for pixel i.

According to an exemplary embodiment of the present invention, for the single-material case $C_i^{-1}$ is the inverse noise variance in each pixel. R (µ) is a regularization term and β a regularization strength parameter. The terms with $C_i^{-1}$ represent a model of correlated Gaussian noise in each pixel.

According to an exemplary embodiment of the present invention, the device 100 for denoising a vector-valued image may comprise a generator 10, a processor 20, and a noise-suppressor 30. The generator 10, the processor 20, and the noise-suppressor 30 may be an electronic device, or an electronic circuit configured to process the functions as described. The generator 10 is configured to generate an initial loss function L_I comprising at least one initial covariance matrix ICM defining a model of correlated noise for each pixel of the vector-valued image.

The processor 20 is configured to provide a final loss function L_F comprising a set of at least one final covariance matrix FCM based on the initial loss function by modifying at least one submatrix and/or at least one matrix element of the initial covariance matrix ICM.

The noise-suppressor 30 is configured to denoise the vector-valued image using the final loss function L_F comprising the set of the at least one final covariance matrix FCM.

Figure 5:
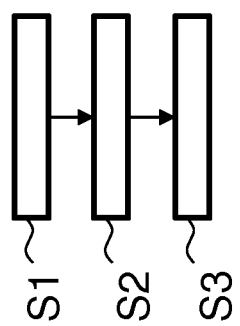
FIG. 5 shows a schematic diagram of a flow-chart diagram for denoising a vector-valued image according to an exemplary embodiment of the present invention.

FIG. 5 shows a schematic diagram of a flow-chart diagram denoising a vector-valued image according to an exemplary embodiment of the present invention.

As a first step of the method, generating S1 an initial loss function L_I comprising at least one initial covariance matrix ICM defining a model of correlated noise for each pixel of the vector-valued image by means of a generator 10 may be performed.

As a second step of the method, providing S2 a final loss function L_F comprising a set of at least one final covariance matrix FCM based on the initial loss function L_I by modifying at least one submatrix and/or at least one matrix element of the initial covariance matrix by means of a processor 20 may be performed.

As a third step of the method, denoising S3 the vector-valued image using the final loss function L_F comprising the set of the at least one final covariance matrix FCM by means of a noise-suppressor 30 may be performed.

According to an exemplary embodiment of the present invention, the modifying of the at least one submatrix and/or of the at least one matrix element of the initial covariance matrix ICM for providing the final covariance matrix FCM is performed based on at least two different spatial frequency bands.

According to an exemplary embodiment of the present invention, the images are split into different spatial frequency bands, e.g. high and low spatial frequencies. Depending on the frequency bands the correlation between the different materials is then modified in the cost function at the expense of a reduced performance of removing correlated noise in these bands as the noise model now assumes less correlation due to the reduced correlation.

According to an exemplary embodiment of the present invention, the final loss function L_F comprising the final covariance matrix FCM based on the initial loss function L_I is provided by reducing absolute values of off-diagonal elements of the initial covariance matrix ICM at edges of material inhomogeneities of the vector-valued image.

In other words, in statistical iterative denoising typically a maximum likelihood function is minimized. The maximum likelihood function comprises a data term that models the noise statistics, commonly with a Gaussian noise model. For denoising of material images in spectral CT this noise model is described by covariance matrices, which have a high correlation coefficient representing the strong noise correlation between the images. This strong correlation can lead to undesired cross-talk in the material image. The method presented here locally reduces the correlation to suppress the cross-talk in the material image.

In multi-energy CT the noise for one image pixel is strongly correlated between the materials, and thus the coupling introduced by remove efficiently correlated noise portions, but experience shows that it also leads to crosstalk between the material images, e.g. iodine portions can appear in images which should be free from iodine etc. This can result in false diagnostic results and needs to be avoided.

Thereby a material image crosstalk reduction by local reduction of correlation is provided.

It has to be noted that embodiments of the present invention are described with reference to different subject-matters. In particular, some embodiments are described with reference to method type claims, whereas other embodiments are described with reference to the device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined providing synergetic effects that are more than the simple summation of these features.

While the invention has been illustrated and described in detail in the drawings and foregoing description, such illustration and description are to be considered illustrative or exemplary and not restrictive; the present invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be considered as limiting the scope.

The invention claimed is:

1. A device for denoising a vector-valued image in a medical imaging system, the device comprising:
    a generator configured to generate an initial loss function comprising an initial covariance matrix defining a model of correlated noise for each pixel of the vector-valued image;
    a processor configured to divide the initial covariance matrix into two or more matrices based on two or more different spatial frequency bands of the vector-valued image in order to determine a final loss function; and
    a noise-suppressor configured to denoise the vector-valued image using the final loss function.

2. The device according to claim 1, wherein the two or more different spatial frequency bands of the vector-valued image, are defined by at least one high spatial frequency band and by at least one low spatial frequency band.

3. The device according to claim 2,
    wherein the processor is configured to provide a tuning between cross-talk removal and correlated noise removal of frequency noise.

4. The device according to claim 1,
    wherein the generator is configured to generate the initial loss function by adding a regularization term to a matrix product of the initial covariance matrix and the vector-valued image.

5. The device according to claim 4,
    wherein the generator is configured to generate the initial loss function by adding the regularization term comprising a regularization strength parameter.

6. The device according to claim 1,
    wherein the initial covariance matrix is constant for all pixel positions across the vector-valued image.

7. The device according to claim 1,
    wherein the processor is configured to perform:
    a frequency dependent covariance tuning in a material projection domain of a maximum-likelihood CT reconstruction of the vector-valued image; and/or
    projection denoising with a Gaussian noise model of the vector-valued image.

8. The device according to claim 1,
    wherein the processor is configured to reduce absolute values of off-diagonal elements of the initial covariance matrix at edges of material inhomogeneities of the vector-valued image.

9. The device according to claim 8,
    wherein the processor is configured to extract the edges of the material inhomogeneities from the vector-valued image with a reduced noise level.

10. The device according to claim 9,
    wherein the processor is configured to extract the edges of the material inhomogeneities by applying at least one of a Sobel operator, a Prewitt operator, a Marr-Hildreth operator, a Laplacian operator, and a differential edge detection to the vector-valued image.

11. A medical imaging system comprising a device according to claim 1.

12. A computer-implemented method for denoising a vector-valued image in a medical imaging system, the method comprising:
- generating an initial loss function comprising an initial covariance matrix defining a model of correlated noise for each pixel of the vector-valued image;
- dividing the initial covariance matrix into two or more matrices based on two or more different spatial frequency bands of the vector-valued image in order to determine a final loss function; and
- denoising the vector-valued image using the final loss function.

13. The method according to claim 12, further comprising reducing absolute values of off-diagonal elements of the initial covariance matrix at edges of material inhomogeneities of the vector-valued image.

* * * * *